(12) United States Patent
O'Malley et al.

(10) Patent No.: US 11,269,850 B2
(45) Date of Patent: Mar. 8, 2022

(54) METHODS AND SYSTEMS FOR REPAIRING RECORDED CONTENT

(71) Applicant: Comcast Cable Communications, LLC, Philadelpha, PA (US)

(72) Inventors: Shawn O'Malley, Glenside, PA (US); James Bradley Hein, King of Prussia, PA (US); Jeremy Zaucha, West Chester, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 665 days.

(21) Appl. No.: 15/721,349

(22) Filed: Sep. 29, 2017

(65) Prior Publication Data

US 2019/0102420 A1    Apr. 4, 2019

(51) Int. Cl.
*G06F 16/23* (2019.01)

(52) U.S. Cl.
CPC ................. *G06F 16/2365* (2019.01)

(58) Field of Classification Search
None
See application file for complete search history.

(56) References Cited

U.S. PATENT DOCUMENTS

| | | | |
|---|---|---|---|
| 5,978,805 A * | 11/1999 | Carson | G06F 16/1787 |
| 7,296,205 B2 | 11/2007 | Curcio et al. | |
| 9,280,550 B1 * | 3/2016 | Hsu | G06F 3/061 |
| 9,372,870 B1 * | 6/2016 | Levy | H04L 67/1097 |
| 9,405,761 B1 * | 8/2016 | Botelho | G06F 16/1727 |
| 10,019,323 B1 * | 7/2018 | Bai | G06F 11/1004 |
| 2003/0046563 A1 * | 3/2003 | Ma | G06F 21/72 713/190 |
| 2006/0059116 A1 * | 3/2006 | Levi | G06F 16/583 |
| 2007/0124415 A1 * | 5/2007 | Lev-Ran | H04L 67/06 709/217 |
| 2008/0301746 A1 * | 12/2008 | Wiser | H04N 21/4532 725/114 |
| 2009/0102926 A1 * | 4/2009 | Bhogal | G11B 27/36 348/181 |
| 2010/0223495 A1 * | 9/2010 | Leppard | G06F 11/004 714/6.11 |
| 2010/0287382 A1 * | 11/2010 | Gyorffy | G06F 21/36 713/185 |
| 2011/0264717 A1 * | 10/2011 | Grube | G06F 11/0727 707/827 |
| 2012/0209847 A1 * | 8/2012 | Rangan | G06F 16/3347 707/737 |
| 2012/0296891 A1 * | 11/2012 | Rangan | G06F 16/3347 707/722 |
| 2013/0269039 A1 * | 10/2013 | Gold | G06F 21/64 726/27 |

(Continued)

*Primary Examiner* — Wilson Lee
(74) *Attorney, Agent, or Firm* — Ballard Spahr LLP

(57) ABSTRACT

Systems and methods are described for repairing recordings with at least a portion of a content item stored by a user device. If received metadata does not match reference metadata associated with a reference of the content item, one or more portions of the content stored by the user device may be damaged. The reference metadata and at least portions of the reference content item corresponding to the one or more portions of the content stored by the user device that are damaged may be received to replace the damaged content.

23 Claims, 6 Drawing Sheets

(56) References Cited

U.S. PATENT DOCUMENTS

| | | | | |
|---|---|---|---|---|
| 2014/0082749 A1* | 3/2014 | Holland | ............... | G06F 21/645 726/29 |
| 2014/0304505 A1* | 10/2014 | Dawson | ............. | H04L 63/0428 713/165 |
| 2014/0325266 A1* | 10/2014 | Hoffman | ............. | G06F 11/1092 714/6.32 |
| 2014/0351891 A1* | 11/2014 | Grube | ................ | G06F 11/0727 726/3 |
| 2015/0339314 A1* | 11/2015 | Collins | .............. | G06F 16/1744 707/627 |
| 2017/0331670 A1* | 11/2017 | Parkvall | .............. | H04J 11/0056 |
| 2018/0041341 A1* | 2/2018 | Gulati | .................. | H04L 9/0866 |

* cited by examiner

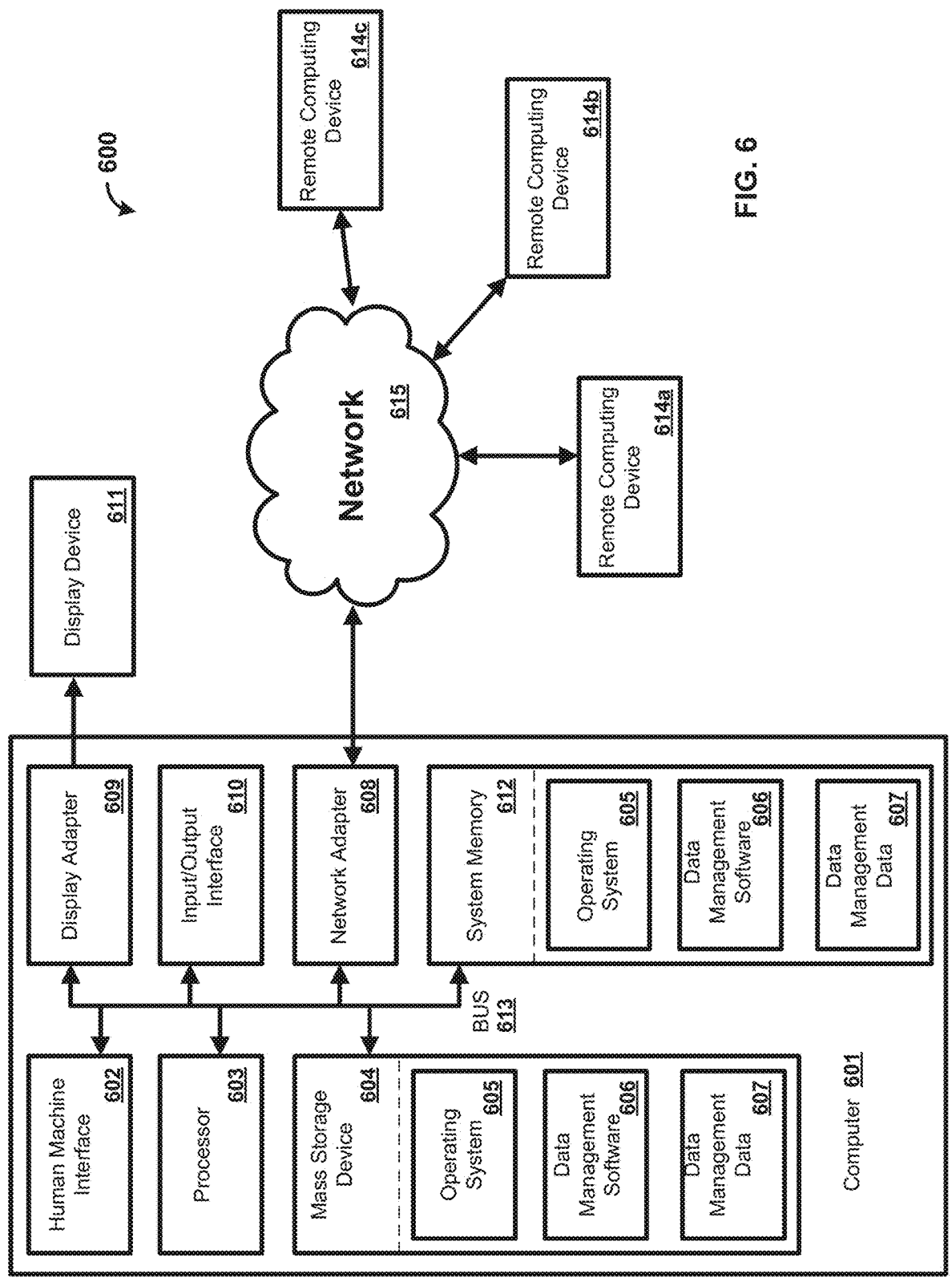

METHODS AND SYSTEMS FOR REPAIRING RECORDED CONTENT

BACKGROUND

Recordings, such as recordings scheduled at a digital video recorder (DVR), may be damaged due to errors in content transmission. Additionally, one or more portions of the recording can be missed. For example, transmission of the content item can be time-shifted relative to an intended transmission time, or a user can indicate that content is to be recorded after a beginning of transmission of the content item. These and other shortcomings are addressed by the methods and systems described herein.

SUMMARY

It is to be understood that both the following general description and the following detailed description are exemplary and explanatory only and are not restrictive. Methods and systems are described for repairing recorded content that includes one or more missing and/or damaged portions.

A content item may be recorded (e.g., by a user device) and metadata may be generated that describes the recording. After a request for playback of the recorded content item, the user device may transmit the metadata describing the recorded content item to a remote computing device (e.g., a server). The server can compare the received metadata describing the recorded content item to metadata that describes a reference recording of the content item. The comparison can reveal whether the received metadata matches the metadata for the reference recording of the content item.

After the server determines that the metadata describing the recorded content item does not match the metadata that describes the reference recording of the content item (indicating that at least one segment of the recorded content item is missing and/or damaged), the server can transmit at least a portion of the metadata that describes the reference recording of the content item to the user device. The server can also send at least a portion of the reference recording of the content item to the user device. The portion of the reference recording can correspond to the one or more missing and/or damaged segments of the recorded content.

The recorded content may be repaired (e.g., by the user device) based on at least a portion of the reference recording of the content item. For example, the user device can insert (e.g., prepend, append, etc.) one or more segments of the reference recording to replace any missing segments of the recorded content. As another example, the user device can overwrite (e.g., replace) a damaged segment of the recorded content item with a corresponding segment of the reference recording of the content item. In this way, the user device can form a repaired content item.

Metadata may be generated (e.g., by a user device) describing the repaired content item. The user device can compare the metadata describing the repaired content item to metadata describing the reference recording of the content item received from the server. If the user device determines that the metadata describing the repaired content item matches the metadata describing the reference recording of the content item, the user device can cause display (e.g., playback, rendering, etc.) of the repaired content item.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 6 is a block diagram illustrating an example computing device.

DETAILED DESCRIPTION

Figure 1:
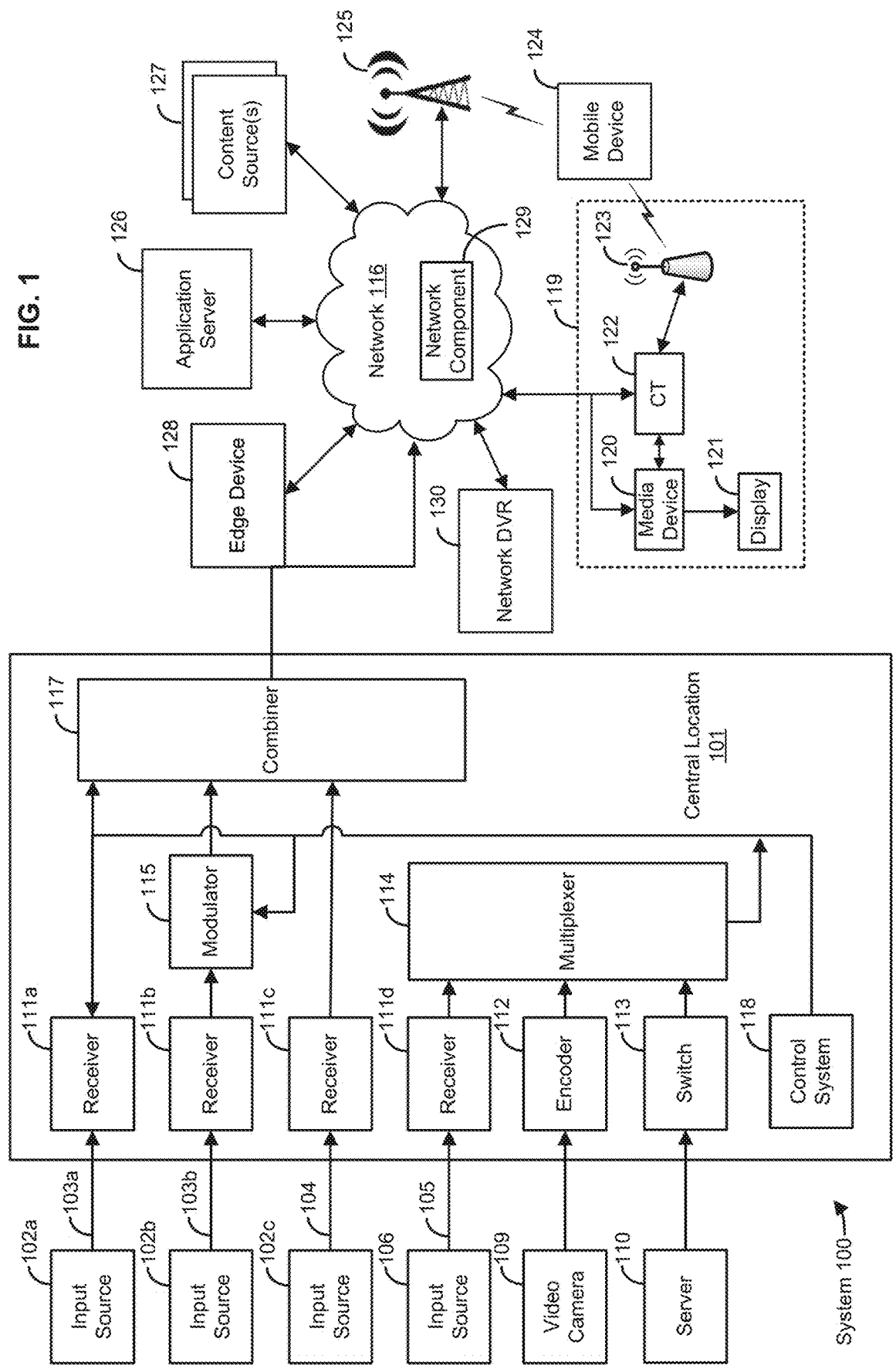
FIG. 1 is a block diagram illustrating various aspects of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4 k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (PDF), Electronic Publication (.EPUB) format created by the International Digital Publishing Forum (IDPF), JPEG (.JPG) format. Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In some aspects, content items can comprise a plurality of segments. As examples, the content item can be divided into segments. The division can be time-wise (e.g., each of the plurality of segments can represent one minute of the content item), byte-wise (e.g., each of the plurality of segments can represent a fixed number of bytes), and/or any other division of the content item. In some aspects, the plurality of segments can represent a logical division of the content item without a separation of the content item into a plurality of separate files.

In various instances, this detailed disclosure may refer to consuming content or the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action. The present disclosure relates to methods and systems for repairing a recording of a content item. A content item can be broadcast or otherwise transmitted to one or more user devices and can also be stored at a data center (e.g., a remote computing device) associated with a content provider. This stored copy of the content item at the data center can be referred to as a reference copy of the content item, or the reference content item. The reference copy of the content item represents a verified (e.g., substantially error free) copy of the content item (e.g., a copy that matches the content item provided by the content provider). The reference copy of the content item can be processed to create reference metadata comprising a reference index file associated with the reference content item and one or more reference checksum values associated with the reference copy of the content item. For example, the reference index file can comprise a content identifier. The reference index file can further comprise a plurality of indexes, each index indicating an offset from a beginning of the reference copy of the content item. The one or more reference checksum values can comprise a first checksum values associated with the entirety of the reference copy of the content item and a plurality of index checksum values.

In an aspect, the one or more user devices (e.g., a DVR or network DVR), can be configured to record the content item or otherwise cause the content item to be recorded. In some aspects, the recorded content item can be stored locally at the user device or remotely in a data store accessible by the user device.

Errors in transmission and/or reception of the content item can cause errors in the recorded content item. Moreover, portions of the recorded content item can be missing. For example, the actual transmission of the content item can be time shifted from the expected transmission (e.g., content scheduled to begin at 6:00 pm and end at 7:00 pm may not begin until 6:05 and end at 7:05 pm following a sporting event that ended later than expected), causing the recording to miss at least an ending portion of the content item. As another example, a user may request recording of the content item after the content item has already begun, causing the recording to miss a beginning portion of the content item. The recorded content item can be processed to form recording metadata comprising a recording index file and recording checksum values.

After a request for playback of the recorded content item at the user device, the user device can upload at least a portion of the recording metadata to a server in communication with the data center. The server can compare the recording metadata to the reference metadata to determine if there are differences between the recorded content item and the reference content item.

The server can parse the recording metadata to determine which segments of the recorded content item are missing and or damaged. Stated differently, the server can parse the recording metadata to determine that the recorded content item is incomplete (e.g., damaged, missing, corrupt, and the like). The server can then transmit, to the user device or a data storage device in communication with the user device, at least a portion of the reference metadata. The at least a portion of the reference metadata can comprise the entirety of the reference metadata. The server can also transmit, to the user device, at least the segments of the reference copy of the content item corresponding to the missing or damaged segments of the recorded content item.

The recorded content item may be modified (e.g., by the user device). The user device may insert (e.g., prepend or append) any segments of the reference content item corresponding to missing segments of the recorded content item. Further, the user device can overwrite (e.g., replace) any damaged segments of the recorded content item with corresponding segments of the reference content item. In this way, the user device can create a repaired content item. The user device can then process the repaired content item to create repair metadata associated with the repaired content item. The user device can compare the repair metadata to the received reference metadata. After determining that the repair metadata matches the reference metadata, the user device can cause display of the repaired content item.

FIG. 1 is an example of a system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an example, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112 are included for encoding local content or a video camera 109 feed. A switch 113 can provide access to the server 110, which can be a Pay-Per-View server, a data server, an Internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an example, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an example, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a T, a monitor, or satellite dish.

In an example, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an example, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an example, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park, etc.

In an example, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

In an example, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, downloadable media, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an example, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an example, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an example, the network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

In an example, a network DVR (NDVR) 130 can be connected to the network 116. The NDVR 130 can be configured to capture broadcast television on a network device, allowing the user to access the recorded programs. The NDVR 130 can provide time-shifted viewing of broadcast programs, allowing the user to record and watch programs at their convenience, without the requirement of a local DVR device. In an example, the NDVR. 130 can comprise or be coupled to a storage device.

As an example, the methods and systems disclosed can be located within, for example, the network component 129. The network component 129 can be one or more computing devices. The network component 129 can receive a content item from one of the content sources 127 and/or the edge device 128. The network component 129 can generate metadata based on the received content item. The generated metadata can comprise index data. The index data can comprise an index file including a content identifier identifying the reference copy of the content item and a plurality of indexes within the reference copy of the content item. The plurality of indexes can be offsets from a beginning of the reference copy of the content item. For example, the indexes can be evenly spaced within the reference copy of the content item. As a particular example, the indexes can be spaced apart by a particular number of bytes. The generated metadata can further comprise checksum data. The checksum data can comprise a first checksum determined (e.g., calculated) based on the entirety of the reference copy of the content item. The checksum data can further comprise a plurality of index checksums, each of the plurality of index checksums associated with a particular one of the plurality of indexes. For example, each of the plurality of index checksums can be determined (e.g., calculated) based on the portion of the reference copy of the content item at the corresponding index (e.g., starting at the corresponding index and ending at the subsequent index). The generated metadata can be stored as reference metadata. For example, the reference metadata can be stored at the network component 129, at a data center in communication with the network component 129, at a cloud storage location accessible to the network component 129, and/or the like.

The reference index data can comprise a content identifier identifying the content item recorded by the user device and a plurality of indexes. Each of the plurality of indexes can indicate an offset from a beginning of the reference copy of the content item. The reference checksum data can comprise a content checksum verifying data integrity of the reference copy of the content item and a plurality of index checksums. Each of the plurality of index checksums verifies data integrity of content data beginning at a corresponding one of the plurality of indexes and ending at a subsequent one of the plurality of indexes.

A user device (e.g., the media device 120 and/or the NDVR 130) can comprise a digital video recorder. The digital video recorder can be configured to cause recording of a particular content item. For example, the user device can record the content locally, can cause the content to be stored or otherwise recorded at a cloud storage location accessible by the user device, and/or the like. After completion of recording the content item, the user device can process the recorded content item to generate metadata associated with the recorded content item. As another example, the user device can process the content item as the content item is being recorded (e.g., upon completion of each of the plurality of segments, substantially in real time, etc.).

The generated metadata can comprise index data. The index data can comprise an index file including a content identifier identifying the content item and a plurality of indexes within the recorded content item. The plurality of indexes can be offsets from a beginning of the recorded content item. For example, the indexes can be evenly spaced within the recorded content item. As a particular example, the indexes can be spaced apart by a particular number of bytes. The generated metadata can further comprise checksum data. The checksum data can comprise a first checksum determined (e.g., calculated) based on the entirety of the recorded content item. The checksum data can further comprise a plurality of index checksums, each of the plurality of index checksums associated with a particular one of the plurality of indexes. For example, each of the plurality of index checksums can be determined (e.g., calculated) based on the portion of the recorded content item at the corresponding index (e.g., starting at the corresponding index and ending at the subsequent index). The generated metadata can be stored as recording metadata. For example, the recording metadata can be stored at the user device, at a data center in communication with the user device, at a cloud storage location accessible to the user device, and/or the like.

The recording index data can comprise a content identifier identifying the content item recorded by the user device and a plurality of indexes. Each of the plurality of indexes can indicate an offset from a beginning of the content item recorded by the user device. The recording checksum data can comprise a content checksum verifying data integrity of the content item recorded by the user device and a plurality of index checksums. Each of the plurality of index checksums verifies data integrity of content data beginning at a corresponding one of the plurality of indexes and ending at a subsequent one of the plurality of indexes.

The user device can transmit the recording metadata to the network component 129 for verification. In some examples, the recording metadata can be transmitted after completion of storing the recording metadata. In other examples, the recording metadata can be transferred after a request for playback of the recorded content item. The network component 129 can compare the checksum data of the recording metadata to the checksum data of the reference metadata. For example, where the checksum data of the recording metadata matches (e.g., is substantially the same as) the checksum data of the reference metadata, the recording of the content item can be determined to be successful. In other situations (e.g., where the checksum data of the recording metadata does not match the checksum data of the reference metadata), it can be determined that one or more segments of the recorded content item are damaged and/or missing. Stated differently, it can be determined that the recorded content item is incomplete.

The network component 129 can parse the index file and/or the checksum data of the recording metadata to determine segments of the recorded content item are missing or damaged. For example, a number of indexes, index numbers of the index data, and the values of the checksum data can be compared to the reference index data and/or the reference checksum data. The network component 129 can transmit, to the user device, at least a portion (e.g., all) of the reference metadata and at least segments of the reference copy of the content item corresponding to the segments of the recorded content item that are determined to be missing or damaged. For example, the network component 129 can transmit at least the reference checksum data and the reference index data to the user device. In some examples, the network component 129 can transmit the reference content item to the user device.

After receiving the at least the portion of the reference metadata, the user device can modify the recorded content item. After receiving the segments of the reference copy of the content item corresponding to missing and/or damaged segments of the recorded content item, the user device can insert (e.g., prepend, append, etc.) segments of the reference copy of the content item corresponding to portions of the recorded content item determined to be missing. The user device can further overwrite (e.g., replace) segments of the recorded content item determined to be damaged with a corresponding segment of the reference copy of the content item. Upon completion of the insertions and/or the overwriting, the modified content item can be saved as a repaired content item.

While the foregoing paragraphs describe the content in terms of recording for ease of explanation, a person skilled in the art would appreciate that recording or recorded content can be more generally described as storing or stored data. For example, the user device can store the content data, can store data associated with the content, and so forth. Further, as will be appreciated by on skilled in the art, the content recording and storing may occur on any capable device such as on a server, a display device, a storage device connected to the network 116, a storage device associated with the user device, and should not be limited to merely the user device.

After saving the repaired content item, the user device can generate metadata associated with the repaired content item. The generated metadata can comprise index data. The index data can comprise an index file including a content identifier identifying the repaired content item and a plurality of indexes within the repaired content item. The plurality of indexes can be offsets from a beginning of the repaired content item. For example, the indexes can be evenly spaced within the repaired content item. As a particular example, the indexes can be spaced apart by a particular number of bytes. The generated metadata can further comprise checksum data. The checksum data can comprise a first checksum determined (e.g., calculated) based on the entirety of the repaired content item. The checksum data can further comprise a plurality of index checksums, each of the plurality of index checksums associated with a particular one of the plurality of indexes. For example, each of the plurality of index checksums can be determined (e.g., calculated) based on the portion of the repaired content item at the corresponding index (e.g., starting at the corresponding index and ending at the subsequent index). The generated metadata can be stored as repair metadata. For example, the repair metadata can be stored at the user device, at a data center in communication with the user device, at a cloud storage location accessible to the user device, and/or the like. The user device can further compare the repair metadata to the reference metadata received from the network device 129.

After a determination that the repair metadata matches the reference metadata (e.g., each of the checksums of the repair metadata is equivalent to a corresponding checksum in the reference metadata), the user device can cause display (e.g., playback) of the repaired content item. For example, the repaired content item can be displayed at the media device 120, the display 121, and/or any other user device capable of displaying the repaired content item.

Figure 2:
FIG. 2 is a diagram illustrating an example of a data flow.

FIG. 2 shows an example of a data flow 200 for repairing a recording of a content item comprising a missing or damaged segment. A user device (e.g., the media device 120 and/or the NDVR 130) can store a recording 202 of a content item. The recording 202 can comprise a plurality of segments $202_1$, $202_2$, ... $202_N$. The user device can create recording metadata 204 describing the content item recording. The metadata 204 can comprise index data 206 and checksum data 208. Additionally, a server (e.g., the network component 129) can receive a reference recording 210 of the content item comprising a plurality of segments $210_1$, $210_2$, ..., $210_N$ and reference metadata 212 describing the reference recording 210. The reference metadata 212 can comprise reference index data 214 and reference checksum data 216.

The user device can transmit the recording metadata 204 to the server. The server can compare the recording metadata 204 to the reference metadata 212. The server can determine, based on a difference between the recording metadata 204 and the reference metadata 212, that a section of content item recording 202 is missing and/or damaged. For example, as shown in FIG. 2, a difference between the checksum data 208 of the recording metadata associated with segment $202_2$ and the checksum data 216 of the reference metadata associated with segment $210_2$ can indicate that the segment $202_2$ is missing and or damaged.

After determining that at least one segment of the recording 202 is missing and/or damaged, the server can transmit, to the user device, the reference metadata 212 and at least the segment of the reference recording 210 corresponding to the damaged segment of the recording 202. For example, in FIG. 2, the server is shown to transmit the segment $210_2$ of the reference recording 210 corresponding to the segment $202_2$ of the recording 202 determined to be missing and/or damaged.

The user device can modify the recording 202 based on the received at least one segment of the reference recording 210. For example, the received at least one segment of the reference recording 210 can be used to overwrite at least one segment of the recording 202 determined to be damaged. As a particular example, the user device can overwrite the segment $202_2$ with the received segment $210_2$ from the reference recording 210, thereby forming a repaired recording 216 of the content item.

The user device can generate repair metadata 218 describing the repaired recording 216 of the content item. The repair metadata 218 can comprise repair index data 220 and repair checksum data 222. The user device can compare the repair metadata 218 with the received reference metadata 212. If the repair metadata 218 matches the received reference metadata 212, the user device can cause the repaired recording 216 of the content item to be displayed and/or stored for later display.

Figure 3:
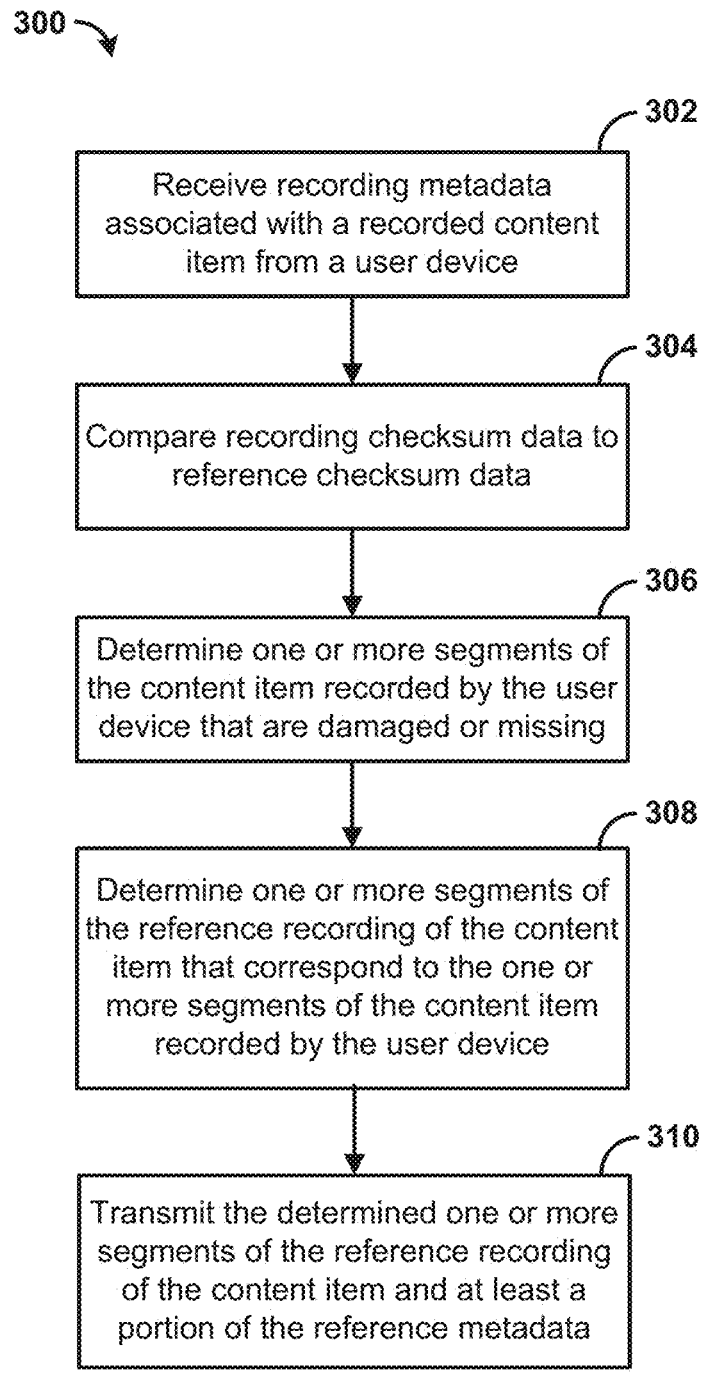
FIG. 3 is a flowchart illustrating an example method.

FIG. 3 shows an example method 300. In step 302, a server (e.g., the network component 129) can receive stored metadata associated with at least a portion of a content item stored by a user device (e.g., the media device 120 and/or the NDVR 130). As an example, the stored content item may be a content item recorded by the user device, and the stored metadata may be recording metadata. The server can receive the recording metadata from the user device. The recording metadata can comprise at least recording checksum data and recording index data.

The recording index data can comprise an index file including a content identifier identifying the content item recorded by the user device and a plurality of indexes within the content item. The plurality of indexes can be offsets from a beginning of the content item. For example, the indexes can be evenly spaced within the content item. As a particular example, the indexes can be spaced apart by a particular number of bytes.

The recording checksum data can comprise a first checksum determined (e.g., calculated) based on the entirety of the content item. The recording checksum data can further comprise a plurality of index checksums, each of the plurality of index checksums associated with a particular one of the plurality of indexes. For example, each of the plurality of index checksums can be determined (e.g., calculated) based on the portion of the content at the corresponding index (e.g., starting at the corresponding index and ending at the subsequent index). Each of the first checksum and the plurality of index checksums can be used to verify data integrity of the recording of the content item. Each of the first checksum and the plurality of index checksums can be generated using a particular checksum algorithm. For example, a cryptographic hash function can be used as the checksum algorithm. As a particular example, a message digest algorithm, such as the MD5 algorithm, can be used as the checksum algorithm.

In step 304, the server can compare the stored checksum data to reference checksum data associated with a reference recording of the content item. In one example, the stored checksum data may be recording checksum data. In particular, reference metadata associated with the reference recording of the content item can be retrieved form memory by the server. For example, the reference metadata can be retrieved from local memory, from a data center in communication with the server, from a cloud storage location in communication with the server, and/or the like. The reference metadata can comprise the reference checksum data and reference index data. The server can compare each value of the recording checksum data to a corresponding value of the reference checksum data.

In step 306, the server can determine, based on the comparison of step 304, one or more segments of the content item stored by the user device that are damaged or missing. In one example, the content item stored by the user device is a recorded content item. Segments that are missing from the recorded content item can be considered to be damaged. For example, the server can determine a mismatch between the recording checksum data and the reference checksum data. The mismatch can indicate that one or more of the segments corresponding to the mismatch is damaged. As another example, can determine that at least a portion of the recording checksum data is absent, and can determine that one or more segments of the content item recorded by the user device corresponding to the absent recording checksum data are missing. While steps 304 and 306 are described as distinct steps, a person skilled in the art would appreciate that steps 304 and 306 could be accomplished as a single step by the server.

The server can identify one or more segments of the content recorded by the user device that are damaged or missing. For example, the server can parse the received index data to compare the received index data to the reference index data to determine one or more missing or damaged segments of the recorded content item. The server can compare the index checksums of the received checksum data to the index checksums of the reference checksum data to determine that one or more segments is damaged. As an example, the server can compare the received index data to the reference index data; the server can also compare the received checksum data to the reference checksum data. Any differences in the index data indicate a corrupted segment of the content.

In step 308, the server can determine one or more segments of the reference of the content item that correspond to the one or more segments of the stored content item that are damaged or missing. In one example, the stored content item is a recorded content item, and the reference of the content item is a reference recording. As an example, the one or more segments of the reference recording of the content item can be determined based on the received index data and reference index data associated with the reference recording of the content item. In particular, if a first segment of the recorded content item is missing, a first segment of the reference recording of the content item can be determined to correspond to the missing segment of the recorded content item.

In step 310, the server can transmit, to the user device, the reference metadata and the determined one or more segments of the reference content item corresponding to the one or more portions of the content stored by the user device that are missing and/or damaged. In an example, the server can transmit the entire reference content item to the user device. In an example, the content stored by the user device is recorded content.

After the user device receiving the determined one or more segments of the reference content item corresponding to the one or more portions of the content stored by the user device that are missing and/or damaged, the user device can repair the content item and cause the repaired content item to be displayed.

Figure 4:
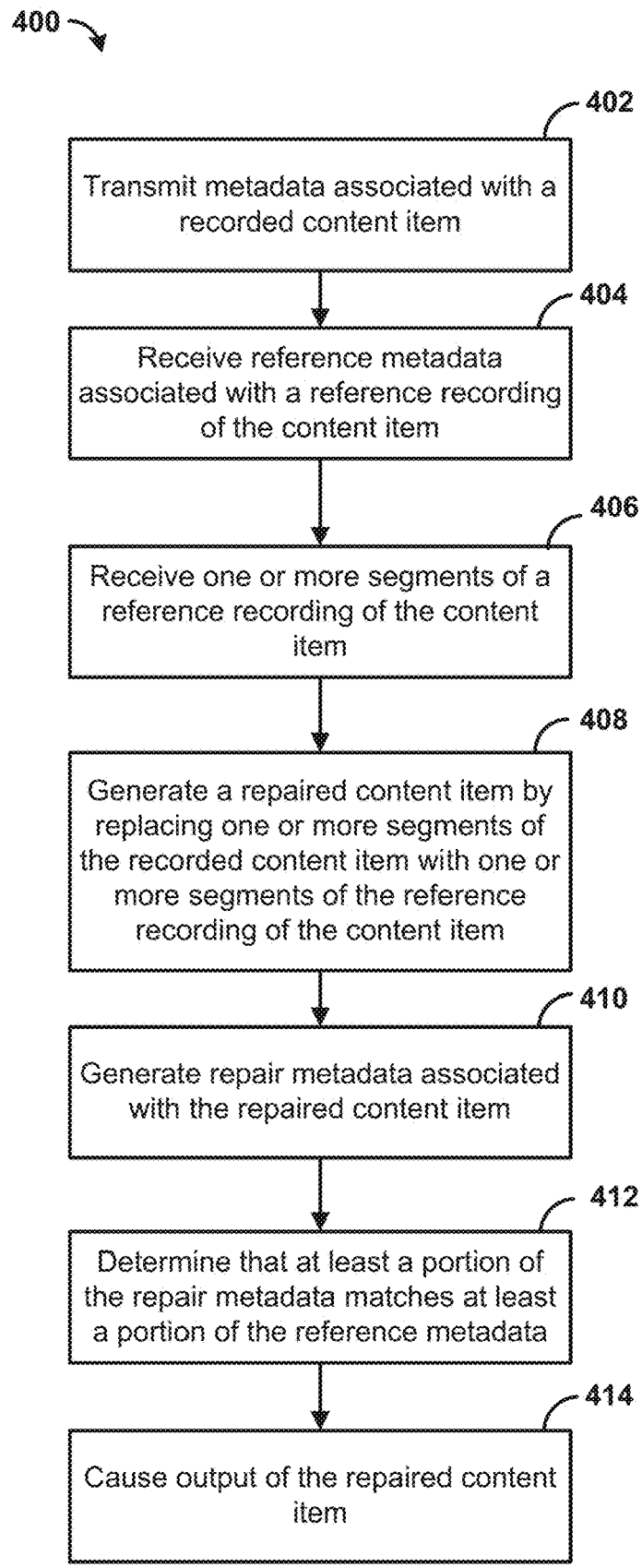
FIG. 4 is a flowchart illustrating an example method.

FIG. 4 shows an example method 400. In step 402, a user device (e.g., the media device 120 and/or the NDVR 130) can transmit, to a server (e.g., the network component 129), stored metadata associated with at least a portion of a content item stored by the user device. In an example, the stored content item is a recorded content item, and the stored metadata is recording metadata. The recording metadata can comprise recording checksum data and recording index data.

The recording index data can comprise an index file including a content identifier identifying the content item and a plurality of indexes within the content item. The plurality of indexes can be offsets from a beginning of the content item. For example, the indexes can be evenly spaced within the content item. As a particular example, the indexes can be spaced apart by a particular number of bytes.

The recording checksum data can comprise a first checksum determined (e.g., calculated) based on the entirety of the content item. The recording checksum data can further comprise a plurality of index checksums, each of the plurality of index checksums associated with a particular one of the plurality of indexes. For example, each of the plurality of index checksums can be determined (e.g., calculated) based on the portion of the content at the corresponding index (e.g., starting at the corresponding index and ending at the subsequent index). Each of the first checksum and the plurality of index checksums can be generated using a particular checksum algorithm. For example, a cryptographic hash function can be used as the checksum algorithm. As a particular example, a message digest algorithm, such as the MD5 algorithm, can be used as the checksum algorithm.

For example, the recording metadata may be directly transmitted (e.g., by the user device) to the server. As another example, the recording metadata may be transmitted (e.g., by the user device) to a storage location accessible by both the user device and the server. In still another example, the recording metadata may be transmitted (e.g., by the user device) to a cloud storage location associated with the server.

In step 404, the user device can receive at least a portion (e.g., all) of reference metadata associated with a reference of the content item. In an example, the reference of the content item is a reference recording of the content item. For example, the at least the portion of the reference metadata can be transmitted from the server to the user device. As another example, the user device can retrieve the at least the portion of the reference metadata from a storage location (e.g., a database, a cloud storage location, and/or the like) accessible by both the server and the user device. The reference recording of the content item can comprise a verified copy of the content item.

In step 406, the user device can receive at least a portion (e.g., one or more segments) of the reference of the content item. In an example, the reference of the content item is a reference recording of the content item. For example, the user device can receive one or more segments of the reference recording of the content item corresponding to one or more segments of the content recorded by the user device that are damaged and/or missing. As another example, the user device can receive the full reference recording of the content item.

The one or more segments of the reference recording of the content item can be received from the server. As another example, the one or more segments of the reference recording of the content item can be received from a source other than the server. In particular, the one or more segments of the reference recording of the content item can be received from a storage device in communication with the server. This can help to reduce load on the server while taking advantage of network path efficiencies inherent in device to device communication, such as shorter paths and lower latency.

In step 408, the user device can generate a repaired content item by replacing (e.g., overwriting) one or more segments of the content item stored by the user device that are damaged with the received one or more segments of the reference of the content item. In an example, the content item stored by the user device is a recorded content item, and the reference of the content item is a reference recording of the content item.

In particular, replacing the one or more segments of the content item recorded by the user device can comprise determining that an index checksum of the plurality of index checksums of the reference metadata does not match a corresponding index checksum in the checksum data associated with the recorded content item. The user device can determine an index associated with the corresponding index checksum in the checksum data associated with the recorded content item, and can determine a segment of the reference content item associated with the determined index. The user device can overwrite a segment of the recorded content item starting at the determined index with the determined segment of the reference content item As another example, if the content item recorded by the user device is found to be missing one or more segments, the user device can insert (e.g., append, prepend, etc.) one or more segments of the reference recording of the content item into the content item recorded by the user device. As particular examples, one or more segments of the reference recording of the content item can be prepended before a first segment of the contentment item recorded by the user device and/or appended after a final segment of the contentment item recorded by the user device.

In particular, replacing the one or more segments of the content item recorded by the user device can comprise determining an index of the reference metadata is not present in the index data associated with the recorded content item. The user device can determine a segment of the reference content item associated with the determined index, and can insert a segment of the reference content item into the recorded content item based on the determined index.

In this way, the user device can create a repaired content item. The repaired content item can be saved by the user device. For example, the repaired content item can be stored at the user device, at a data center in communication with the user device, at a cloud storage location accessible to the user device, and/or the like.

In step 410, the user device can generate repair metadata associated with the repaired content item. The repair metadata can comprise repair index data and repair checksum data.

The repair index data can comprise an index file including a content identifier identifying the repaired content item and a plurality of indexes within the repaired content item. The plurality of indexes can be offsets from a beginning of the content item. For example, the indexes can be evenly spaced within the content item. As a particular example, the indexes can be spaced apart by a particular number of bytes.

The repair checksum data can comprise a first checksum determined (e.g., calculated) based on the entirety of the repaired content item. The repair checksum data can further comprise a plurality of index checksums, each of the plurality of index checksums associated with a particular one of the plurality of indexes. For example, each of the plurality of index checksums can be determined (e.g., calculated) based on the portion of the repaired content at the corresponding index (e.g., starting at the corresponding index and ending at the subsequent index). Each of the first checksum and the plurality of index checksums can be generated using a particular checksum algorithm. For example, a cryptographic hash function can be used as the checksum algorithm. As a particular example, a message digest algorithm, such as the MD5 algorithm, can be used as the checksum algorithm The user device can store the repair metadata. For example, the repair metadata can be stored at the user device, at a data center in communication with the user device, at a cloud storage location accessible to the user device, and/or the like. The repair metadata can be stored at the same location as the repaired content item. As another example, the repair metadata can be stored separately relative to the repaired content item.

In step 412, the user device can determine that at least a portion of the repair metadata matches at least a portion of the received reference metadata. For example the user device can compare at least the reference index data with the repair index data to determine that the reference index data and the repair index data match. In some examples, the user device can further compare the reference checksum data with the repair checksum data to determine that the reference checksum data and the repair checksum data match.

In step 414, the user device can cause output of the repaired content item. For example, causing the repaired content item to be output can comprise displaying the repaired content item at the media device 120, the display 121, and/or any other user device capable of displaying content.

Figure 5:
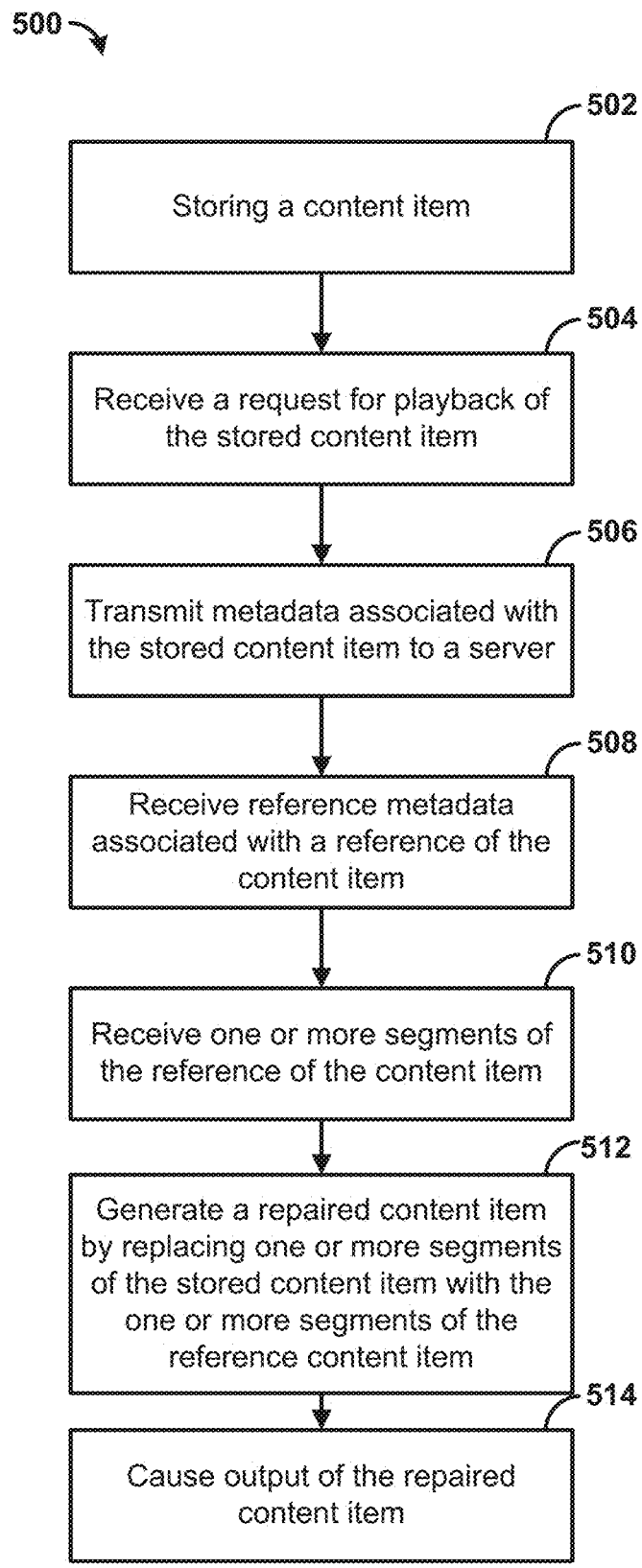
FIG. 5 is a flowchart illustrating an example method.

FIG. 5 shows an example method 500. In step 502, a user device (a the media device 120) can store a content item. As an example, the user device can record a content item for playback at a later time. After completion of recording the content item, the user device can process the recorded content item to generate recording metadata associated with the recorded content item. The generated recording metadata can comprise index data and checksum data.

The index data can comprise an index file including a content identifier identifying the recorded content item and a plurality of indexes within the recorded content item. The plurality of indexes can be offsets from a beginning of the recorded content item. For example, the indexes can be evenly spaced within the recorded content item. As a particular example, the indexes can be spaced apart by a particular number of bytes.

The checksum data can comprise a first checksum determined (e.g., calculated) based on the entirety of the recorded content item. The checksum data can further comprise a plurality of index checksums, each of the plurality of index checksums associated with a particular one of the plurality of indexes. For example, each of the plurality of index checksums can be determined (e.g., calculated) based on the portion of the recorded content item at the corresponding index (e.g., starting at the corresponding index and ending at the subsequent index). Each of the first checksum and the plurality of index checksums can be generated using a particular checksum algorithm. For example, a cryptographic hash function can be used as the checksum algorithm. As a particular example, a message digest algorithm, such as the MD5 algorithm, can be used as the checksum algorithm.

In step 504, the user device can receive a request for playback of the stored content item. For example, the user device can receive a request to playback a recorded content item. The request for playback can be received at a second time. The second time can be subsequent to the first time. The second time can be after completion of the recording of the content item.

In step 506, the user device can transmit, to a server (e.g., the network device 129), the stored metadata associated with at least a portion of the stored content item. In an example, the stored metadata may be recording metadata associated with a recorded content item. For example, the user device can transmit the recording metadata directly to the server. As another example, the user device can transmit the recording metadata to a storage location accessible by both the user device and the server. In still another example, the user device can transmit the recording metadata to a cloud storage location associated with the server.

In step 508, the user device can receive reference metadata associated with a reference of the content item. In an example, the reference of the content item is a reference recording of the content item. For example, the reference metadata can be transmitted from the server to the user device. As another example, the user device can retrieve the reference metadata from a storage location (e.g., a database, a cloud storage location, and/or the like) accessible by both the server and the user device.

In step 510, the user device can receive at least a portion (e.g., one or more segments) of the reference of the content item. In an example, the reference of the content item is a reference recording of the content item. For example, the user device can receive one or more segments of the reference recording of the content item corresponding to one or more segments of the content item recorded by the user device that are damaged and/or missing. As another example, the user device can receive the full reference recording of the content item.

In step 512, the user device generates a repaired content item by replacing one or more segments of the content item stored by the user device that are damaged with the received one or more segments of the reference content item. In an example, the stored content item may be a content item recorded by the user device.

In particular, replacing one or more segments of the content item recorded by the user device can comprise the user device determining that an index checksum of the plurality of index checksums of the reference metadata does not match a corresponding index checksum in the checksum data associated with the recorded content item. The user device can determine an index associated with the corresponding index checksum in the checksum data associated with the recorded content item and determine a segment of the reference content item associated with the determined index. The user device can overwrite a segment of the recorded content item starting at the determined index with the determined segment of the reference content item.

As another example, if the content item recorded by the user device is found to be missing one or more segments, the user device can insert one or more missing segments of the reference recording of the content item into the content item recorded by the user device. As particular examples, missing segments can be prepended before a first segment of the contentment item recorded by the user device and/or appended after a final segment of the contentment item recorded by the user device.

In particular, replacing one or more segments of the content item recorded by the user device can comprise the user device determining an index of the reference metadata is not present in the index data associated with the recorded content item. The user device can determine a segment of the reference content item associated with the determined index, and insert a segment of the reference content item into the recorded content item based on the determined index.

In this way, the user device can generate a repaired content item. The repaired content item can be saved by the user device. For example, the repaired content item can be stored at the user device, at a data center in communication with the user device, at a cloud storage location accessible to the user device, and/or the like.

In step 514, the user device can cause output of the repaired content item. For example, causing output of the repaired content item can comprise displaying the repaired content item at the media device 120, the display 121, and/or any other user device capable of displaying content.

While FIGS. 4 and 5 are described with reference to a user device for ease of explanation, a person skilled in the art would appreciate that any device may perform the aforementioned methods such as a server, a computing device associated with the user device, any device within system 100, etc.

In one example, the methods and systems can be implemented on a computer 601 as shown in FIG. 6 and described below. By way of example, the media device 120 and/or the network device 129 of FIG. 1 can be a computer 601 as shown in FIG. 6. The methods and systems disclosed can utilize one or more computers to perform one or more functions in one or more locations. FIG. 6 shows an example of an operating environment 600 for performing the disclosed methods. The operating environment 600 is only an example of an operating environment and is not intended to suggest any limitation as to the scope of use or functionality of operating environment architecture. Neither should the operating environment 600 be interpreted as having any dependency or requirement relating to any one or combination of components illustrated in the operating environment 600.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 601. The computer 601 can comprise one or more components, such as one or more processors 603, a system memory 612, and a bus 613 that couples various components of the computer 601 including the one or more processors 603 to the system memory 612. In the case of multiple processors 603, the system can utilize parallel computing.

The bus 613 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and one or more of the components of the computer 601, such as the one or more processors 603, a mass storage device 604, an operating system 605, recording repair software 606, recording repair data 607, a network adapter 608, a system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. As an example, readable media can be any available media that is accessible by the computer 601 and comprises, for example and not meant to be limiting, both volatile and non-volatile media, removable and non-removable media. The system memory 612 can comprise computer readable media in the form of volatile memory, such as random access memory (RAM), and/or non-volatile memory, such as read only memory (ROM). The system memory 612 typically can comprise data such as recording repair data 607 and/or program modules such as operating system 605 and recording repair software 606 that are accessible to and/or are operated on by the one or more processors 603.

In another example, the computer 601 can also comprise other removable/non-removable, volatile/non-volatile computer storage media. The mass storage device 604 can provide non-volatile storage of computer code, computer readable instructions, data structures, program modules, and other data for the computer 601. For example, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and recording repair software 606. One or more of the operating system 605 and recording repair software 606 (or some combination thereof) can comprise program modules and the recording repair software 606. The recording repair data 607 can also be stored on the mass storage device 604. The recording repair data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 615.

In another example, the user can enter commands and information into the computer 601 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 603 via a human machine interface 602 that is coupled to the bus 613, but can be connected by other interface and bus structures, such as a parallel port, game port, an IEEE 1394 Port (also known as a Firewire port), a serial port, network adapter 608, and/or a universal serial bus (USB).

In yet another example, a display device 611 can also be connected to the bus 613 via an interface, such as a display adapter 609. It is contemplated that the computer 601 can have more than one display adapter 609 and the computer 601 can have more than one display device 611. For example, a display device 611 can be a monitor, an LCD (Liquid Crystal Display), light emitting diode (LED) display, television, smart lens, smart glass, and/or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device 614a,b,c can be a personal computer, computing station (e.g., workstation), portable computer (e.g., laptop, mobile phone, tablet device), smart device smartphone, smart watch, activity tracker, smart apparel, smart accessory), security and/or monitoring device, a server, a router, a network computer, a peer device, edge device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are shown herein as discrete blocks, although it is recognized that such programs and components can reside at various times in different storage components of the computing device 601, and are executed by the one or more processors 603 of the computer 601. An implementation of recording repair software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving metadata associated with a content item, wherein the received metadata comprises checksum data and index data;
   determining, based on a difference between the checksum data and reference checksum data associated with a reference content item associated with the content item, an issue associated with one or more segments of the content item;
   determining, based on the index data and reference index data associated with the reference content item, one or more reference segments of the reference content item that correspond to the one or more segments of the content item; and
   sending, to a user device, at least the one or more reference segments of the reference content item and at least a portion of the received metadata.

2. The method of claim 1, wherein the index data comprises:
   a content identifier identifying the content item; and
   a plurality of indexes, wherein each index of the plurality of indexes indicates an offset from a beginning of the content item.

3. The method of claim 2, wherein the checksum data comprises:
   a content checksum verifying data integrity of the content item; and
   a plurality of index checksums, wherein each index checksum of the plurality of index checksums verifies data integrity of content data beginning at a corresponding one index of the plurality of indexes and ending at a subsequent one index of the plurality of indexes.

4. The method of claim 1, wherein the checksum data comprises data formed using a MD5 algorithm.

5. The method of claim 1, wherein determining, based on the difference between the checksum data and the reference checksum data associated with the reference content item associated with the content item, the issue associated with the one or more segments of the content item comprises determining a mismatch between the checksum data and the reference checksum data, wherein the mismatch indicates the one or more segments of the content item are damaged.

6. The method of claim 1, wherein determining, based on the difference between the checksum data and the reference checksum data associated with the reference content item, the issue associated with the one or more segments of the content item comprises determining an absence of at least a portion of the checksum data, wherein the absence indicates that the one or more segments of the content item are missing.

7. The method of claim 1, further comprising:
   determining, based on the issue, the one or more segments of the content item are damaged; and
   generating a repaired content item by replacing the one or more segments of the content item that are damaged with at least a portion of the reference content item.

8. A method comprising:
   sending, to a computing device from a user device, metadata associated with a content item, wherein the metadata comprises checksum data and index data;
   receiving reference metadata associated with a reference content item associated with the content item, wherein the reference content item comprises a verified copy of the content item;
   receiving one or more reference segments of the reference content item corresponding to one or more segments of the content item that are damaged or missing;
   generating, based on replacing the one or more segments of the content item that are damaged or missing with the received one or more reference segments of the reference content item, a repaired content item;
   generating repair metadata associated with the repaired content item;
   determining that at least a portion of the repair metadata matches at least a portion of the reference metadata; and
   causing output of the repaired content item.

9. The method of claim 8, wherein the reference metadata comprises reference index data comprising:
   a content identifier identifying the reference content item; and
   a plurality of indexes, wherein each index of the plurality of indexes indicates an offset from a beginning of the reference content item.

10. The method of claim 9, wherein the reference metadata comprises reference checksum data comprising:
    a content checksum verifying data integrity of the reference content item; and
    a plurality of index checksums, wherein each index checksum of the plurality of index checksums verifies data integrity of content data beginning at a corresponding one index of the plurality of indexes and ending at a subsequent one index of the plurality of indexes.

11. The method of claim 10, wherein generating, based on replacing the one or more segments of the content item that are damaged or missing with the received one or more reference segments of the reference content item, the repaired content item comprises:
    determining an index associated with a corresponding index checksum in the checksum data associated with the content item; and
    overwriting a segment of the content item starting at the determined index with a reference segment of the reference content item associated with the determined index.

12. The method of claim 10, wherein generating, based on replacing the one or more segments of the content item that are damaged or missing with the received one or more reference segments of the reference content item, the repaired content item comprises:
    determining an index of the reference metadata is not present in the index data associated with the content item; and
    inserting, based on the determined index, a reference segment of the reference content item associated with the determined index into the content item.

13. The method of claim 8, wherein the checksum data comprises data formed using a MD5 algorithm.

14. The method of claim 8, wherein the reference metadata comprises reference checksum data and reference index data, wherein the repair metadata comprises repair index data and repair checksum data, and wherein determining that the at least the portion of the repair metadata matches the at least the portion of the reference metadata comprises determining that the repair index data matches the reference index data.

15. The method of claim 8, wherein receiving one or more reference segments of the reference content item corresponding to the one or more segments of the content item that are damaged or missing comprises receiving an entire reference content item.

16. A method comprising:
    storing, by a user device, a content item;
    receiving a request for playback of the content item;
    sending, to a computing device, after the request for playback, metadata associated with the content item, wherein the metadata comprises checksum data and index data;
    receiving reference metadata associated with a reference content item;
    receiving one or more reference segments of the reference content item corresponding to one or more segments of the content item that are damaged;
    generating, based on the reference metadata and based on replacing the one or more segments of the content item that are damaged with the received one or more reference segments of the reference content item, a repaired content item; and
    causing output of the repaired content item at the user device.

17. The method of claim 16, wherein the index data comprises:
    a content identifier identifying the content item; and
    a plurality of indexes, wherein each index of the plurality of indexes indicates an offset from a beginning of the content item.

18. The method of claim 16, wherein the checksum data comprises:
    a content checksum verifying data integrity of the content item; and
    a plurality of index checksums, wherein each index checksum of the plurality of index checksums verifies data integrity of content data.

19. The method of claim 18, wherein generating, based on replacing the one or more segments of the content item that are damaged or missing with the received one or more reference segments of the reference content item, the repaired content item comprises:
    determining that an index checksum of the plurality of index checksums of the reference metadata does not match a corresponding index checksum in the checksum data associated with the content item; and
    overwriting a segment of the content item with a reference segment of the received one or more reference segments of the reference content item associated with the determined index checksum.

20. The method of claim 18, further comprising:
    determining an index of the reference metadata is not present in the index data associated with the content item; and
    inserting, based on the determined index a reference segment of the received one or more reference segments of the reference content item associated with the determined index into the content item.

21. The method of claim 6, further comprising generating a repaired content item by replacing the one or more segments of the content item that are missing with at least a portion of the reference content item.

22. The method of claim 1, wherein the issue indicates that the one or more segments of the content item associated with the issue are damaged.

23. The method of claim 1, wherein the reference content item comprises a verified copy of the content item.

\* \* \* \* \*